United States Patent [19]

Chao et al.

[11] 4,173,201
[45] Nov. 6, 1979

[54] ILLUMINATED COLLAR FOR PETS AND THE LIKE

[76] Inventors: Ethel Chao; Albert Chao, both of 407 Glendale Rd., Northvale, N.J. 07647

[21] Appl. No.: 829,181

[22] Filed: Aug. 30, 1977

[51] Int. Cl.² ................................................ A01K 27/00
[52] U.S. Cl. ..................................... 119/106; 362/103
[58] Field of Search .................... 119/96, 106, 109; 362/103, 108

[56] References Cited

U.S. PATENT DOCUMENTS

| | | | |
|---|---|---|---|
| 3,935,443 | 1/1976 | Simmons | 362/108 |
| 3,944,803 | 3/1976 | Chao | 362/108 |

FOREIGN PATENT DOCUMENTS 730981  6/1955  United Kingdom ..................... 119/106

*Primary Examiner*—Russell R. Kinsey
*Assistant Examiner*—Robert P. Swiatek
*Attorney, Agent, or Firm*—Richard L. Miller

[57] ABSTRACT

A collar for being worn by a dog, cat or other domesticated pet; the collar including a row of small electric lamps studded around the collar, so as to be visible in darkness or subdued daylight; the circuitry including a replaceable dry cell battery and a manually operated switch mounted on the collar.

1 Claim, 8 Drawing Figures

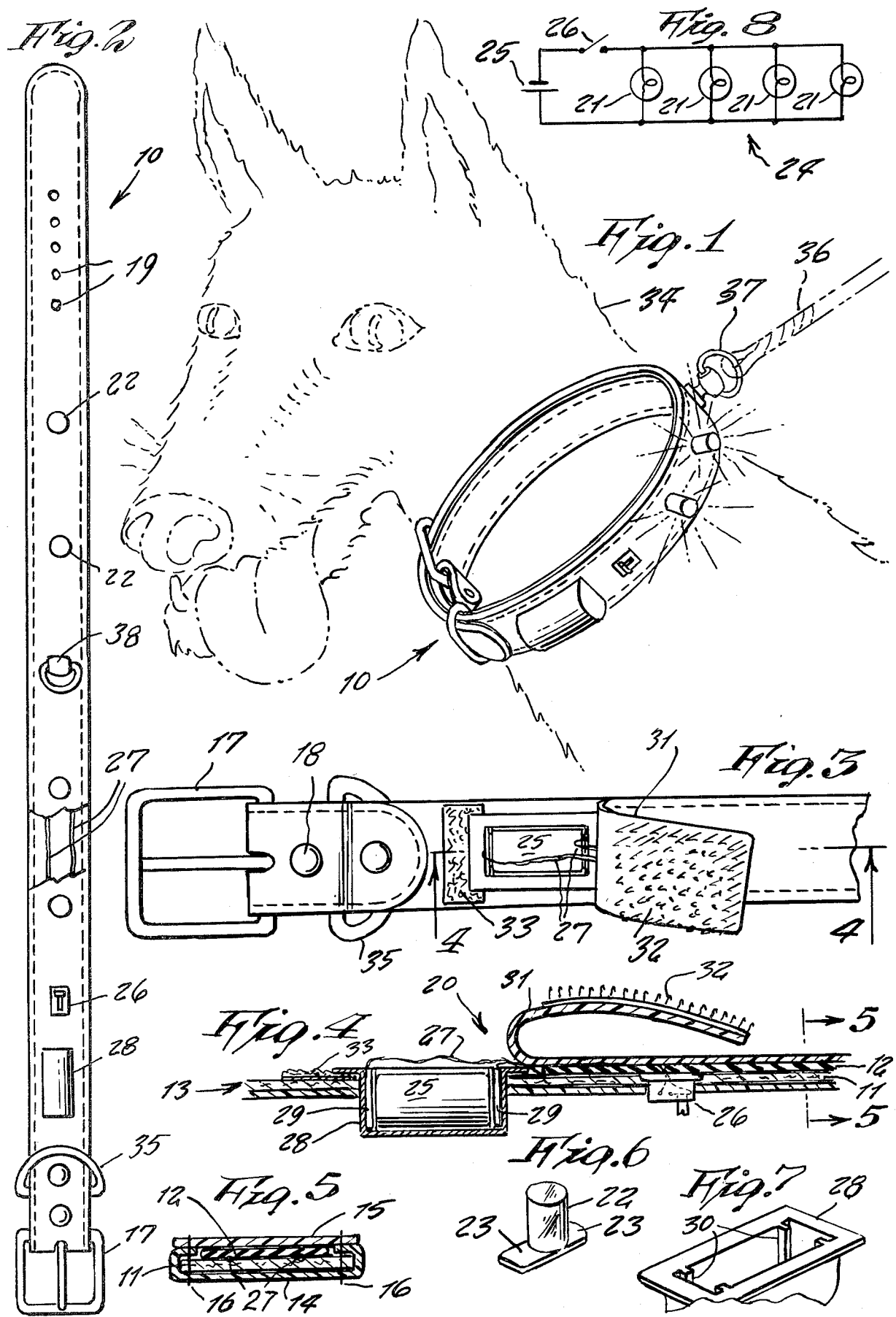

ILLUMINATED COLLAR FOR PETS AND THE LIKE

This invention relates generally to pet collars such as are used for tethering the animal.

A principal object of the present invention is to provide a pet collar which includes a self-contained illumination system of that the location of the animal can be readily identified in the darkness.

Another object accordingly is to provide a pet collar which will promote safety for a pet when crossing a street, so that motorists can readily see the pet in a darkness and avoid hitting the pet.

Yet another object is to provide a pet collar which can be made in different sizes so as to be used either on a dog, cat, domesticated monkey, skunk or racoon, or which can be used on performing animals such as a bear, or the like.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

FIG. 1 is a perspective view of the invention.
FIG. 2 is a top view of the outer side of the collar.
FIG. 3 is an inner side view of one end thereof.
FIG. 4 is a cross section on line 4—4 of FIG. 3.
FIG. 5 is a cross section on line 5—5 of FIG. 4.
FIG. 6 is a view of one of the lamp domes.
FIG. 7 is a detail of the battery housing.
FIG. 8 is a schematic of the electric circuit of the collar.

Referring now to the drawing in greater detail, the reference numeral 10 represents an illuminated collar according to the present invention wherein there is an elongated leather strap 11 having a rubber tape 12 glued to one side of the strap so as to form a core 13 the outer side of which is enclosed by a thin vinyl facing 14 and on its inner side by a vinyl facing 15; the facing 14 wrapping around the side edges of the core, and then being stitched together by stitchings 16, as shown in FIG. 5.

One end of the collar thus formed is looped around a buckle 17 and secured by snap fasteners 18 while an opposite end is provided with a row of holes 19 for being selectively engaged by the buckle.

In the present invention, the collar is additionally incorporated with an illumination system 20 so that the collar can be seen in the darkness.

The system includes several small electric lamps 21 located in a row and protruding outwardly from an outer side of the collar. Each lamp includes a transparent dome 22 as shown in FIG. 6 which is elongated so that it can protrude sufficiently outwardly in order to be visible particularly if the animal has a long-haired fur. The base of each lamp dome includes flanges 23 allowing it to be anchored rigidly behind the core strap while the dome protrudes outwardly.

The lamps 21 are in an electric circuit 24 shown in FIG. 8 which includes a dry cell battery 25 and a switch 26 connected together by thin wire conductors 27 which are placed to run between the strap 11 and the rubber tape 12 of the core where they are thus fully enclosed for protection.

The switch protrudes outwardly from the collar similarly to the lamp domes, so as to be available for manual control.

The battery is enclosed in a molded hard plastic case 28 that likewise protrudes only outwardly of the collar so that it does not interfere with the animal's comfort when the collar is on the animal's neck. A contact plate 29 in each end of the case is retained behind ribs 30, the plates being soldered to the conductor wires while the plates frictionally engage the battery terminals so as to allow easy battery replacement.

Access for battery replacement is provided, as shown in FIGS. 3 and 4, wherein one end of the inner facing is left unstitched so as to form a flap 31 that can be lifted. The flap covers an opening on the rear side of the battery case in normal use; and is secured in position by VELCRO members 32 and 33 one of which is secured to the flap and the other to a rear side of the rubber tape.

In the collar construction it is now apparent that a glue or adhesive is applied to both sides of the rubber tape in order to hold the conductor wires and other components rigidly in place prior to the final stitchings 16 that fasten the assembly together.

In operative use, the collar 10 is placed around a neck of an animal such as a dog 34, and is buckled up, the free end of the collar being fitted under retaining loop 35. A leash 36 can be attached to a ring 37 on a swivel 38 mounted on the collar. When the collar is intended to produce illumination, the switch 26 is simply flipped in an on position.

In use, the collar is comfortable on the animal because there are no inward protrusions from the illumination system components.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An illuminated collar for pets and the like, comprising in combination, a leather strap, a rubber tape glued to one side thereof, forming a central core covered by a plastic facing on its outer side, and a plastic facing on its inner side and stitched together through said core; said collar including a self-contained illumination system that includes a plurality of lamps in a row along said collar, which are in an electric circuit with a replaceable battery and a manually operative switch; a hard plastic battery case containing said battery, said lamps, switch and battery case protruding outwardly from an outer side of said collar, said battery case having an opening on its rear side for access to replace said battery, a rear edge of said battery case having a peripherally extending flange positioned behind said core, said battery case opening being covered by one end portion of said inner plastic facing which is left unstitched, thus forming a liftable tab for allowing said battery access, and said tab being retained closed over said case by means of VELCRO fasteners.

* * * * *